United States Patent [19]
Zander

[11] Patent Number: 5,248,108
[45] Date of Patent: Sep. 28, 1993

[54] FILM CASSETTE WITH UNITARY FILM STRIPPER AND LIGHT BLOCKING DEVICE

[75] Inventor: Dennis R. Zander, Penfield, N.Y.

[73] Assignee: Eastman Kodak Company, Rochester, N.Y.

[21] Appl. No.: 787,802

[22] Filed: Nov. 4, 1991

[51] Int. Cl.⁵ .............................. G03B 17/26
[52] U.S. Cl. .................. 242/71.1; 242/71.7; 242/71.8; 354/275
[58] Field of Search .............. 242/71.0, 71.1, 71.6, 242/71.7, 71.8, 71.9; 354/275

[56] References Cited

U.S. PATENT DOCUMENTS

| | | | |
|---|---|---|---|
| 4,832,275 | 5/1989 | Robertson | 242/71.1 |
| 4,938,429 | 7/1990 | Robertson et al. | 242/71.1 |
| 4,962,401 | 10/1990 | Takahashi | 354/275 |
| 5,031,852 | 7/1991 | Dowling et al. | 242/71.1 |
| 5,032,861 | 7/1991 | Pagano | 354/275 |
| 5,047,794 | 9/1991 | Pagano et al. | 354/275 |
| 5,049,913 | 9/1991 | Pagano et al. | 354/275 |
| 5,083,720 | 1/1992 | Niedospial | 242/71.1 |

FOREIGN PATENT DOCUMENTS

| | | |
|---|---|---|
| 410071 | 5/1934 | Fed. Rep. of Germany . |
| 4002788 | 1/1990 | Fed. Rep. of Germany ..... 242/71.1 |
| 2-271333 | 6/1990 | Japan ......................... 354/275 |

*Primary Examiner*—Daniel P. Stodola
*Assistant Examiner*—Eileen Dunn
*Attorney, Agent, or Firm*—Roger A. Fields

[57] ABSTRACT

In a film cassette, a film stripper is located relative to a film egress passageway to be received between the film leader and the next inward convolution of a film roll to direct the film leader into the passageway responsive to rotation of the film roll in an unwinding direction. According to the invention, the stripper is united with a light blocking device for movement, when the light blocking device is moved to a light blocking position relative to the passageway, to a non-stripping position out of reach of the film roll to prevent receipt of the stripper between the film leader and the next inward convolution and for movement, when the light blocking device is moved to a non-blocking position relative to the passageway, to a stripping position within reach of the film roll to allow receipt of the stripper between the film leader and the next inward convolution.

4 Claims, 10 Drawing Sheets

FILM CASSETTE WITH UNITARY FILM STRIPPER AND LIGHT BLOCKING DEVICE

CROSS-REFERENCE TO RELATED APPLICATIONS

Reference is made to commonly assigned copending applications Ser. No. 07/787,356, entitled FILM CASSETTE WITH INTEGRATED CASSETTE ELEMENT LOCK AND LIGHT BLOCKING DEVICE and filed No. 4, 1991 in the name of Dennis R. Zander, and Ser. No. 07/787,803, entitled FILM CASSETTE WITH FLANGED FILM SPOOL and filed Nov. 4, 1991 in the name of Dennis R. Zander.

BACKGROUND OF THE INVENTION

1. Field of the Invention

The invention relates generally to the field of photography, and in particular to a film cassette 2. Description of the Prior Art Commonly assigned U.S. Pat. No. 4,938,429, issued Jul. 3, 1990, discloses a film cassette wherein a pair of annular constraining flanges are coaxially spaced on a film spool. The flanges radially confine the outermost convolution of a film roll wound on the spool, to prevent the film roll from clock-springing against an inner wall of the cassette shell and thus binding against the inner wall when the spool is rotated in an unwinding direction. A pair of internal cam members located on a control shaft accessible at the exterior of the cassette shell are rotatable with the shaft to separate a pair of light-trapping velvet or plush pads in a film egress passageway, by forcing opposite throat portions or lips of the shell apart. Another pair of internal cam members located on the control shaft are rotated with the first pair of cam members to flex respective limited peripheral sections of the flanges apart a distance sufficient to radially free a corresponding longitudinal section of the outermost film convolution, including its leading end. Then, rotation of the spool in the unwinding direction will cause successive peripheral sections of the flanges to be momentarily flexed apart and each freed section of the outermost film convolution, beginning with its leading end, will be advanced through the passageway to outside the cassette shell. A film stripper located on the control shaft is rotated with the cam members from a non-stripping position removed from the film roll to a stripping position for receipt between the leading film end and a next inward convolution of the film roll to guide the leading film end into the passageway as the spool is rotated in the unwinding direction. The stripper is moved to its stripping position when the light-trapping pads are separated and is returned to its non-stripping position when the light-trapping pads assume their original position.

SUMMARY OF THE INVENTION

The invention is an improved simpler design as compared to the one disclosed in U.S. Pat. No. 4,938,429.

According to the invention, there is provided an improved film cassette wherein a spool is supported for rotation in an unwinding direction inside a cassette shell, a convoluted film roll whose outermost convolution is a film leader is coiled about the spool, a stripper is supported for movement to a stripping position within reach of the film roll for receipt between the film leader and a next inward convolution of the film roll to guide the film leader into a film egress passageway responsive to rotation of the spool in the unwinding direction and to a non-stripping position out of reach of the film roll, and light blocking means is supported for movement to a light blocking position when the stripper is moved to its non-stripping position for preventing ambient light from entering the shell through the passageway and to non-blocking position when the stripper is moved to its stripping position, and wherein the improvement comprises:

said stripper and said light blocking means are united to form a single part.

DETAILED DESCRIPTION OF THE PREFERRED EMBODIMENT

The invention is disclosed as being embodied preferably in a 35 mm film cassette. Because the features of this type of film cassette are generally known, the description which follows is directed in particular to elements forming part of or cooperating directly with the disclosed embodiment. It is to be understood, however, that other elements not specifically shown or described may take various forms known to persons of ordinary skill in the art.

The Film Cassette—General

Figure 1:
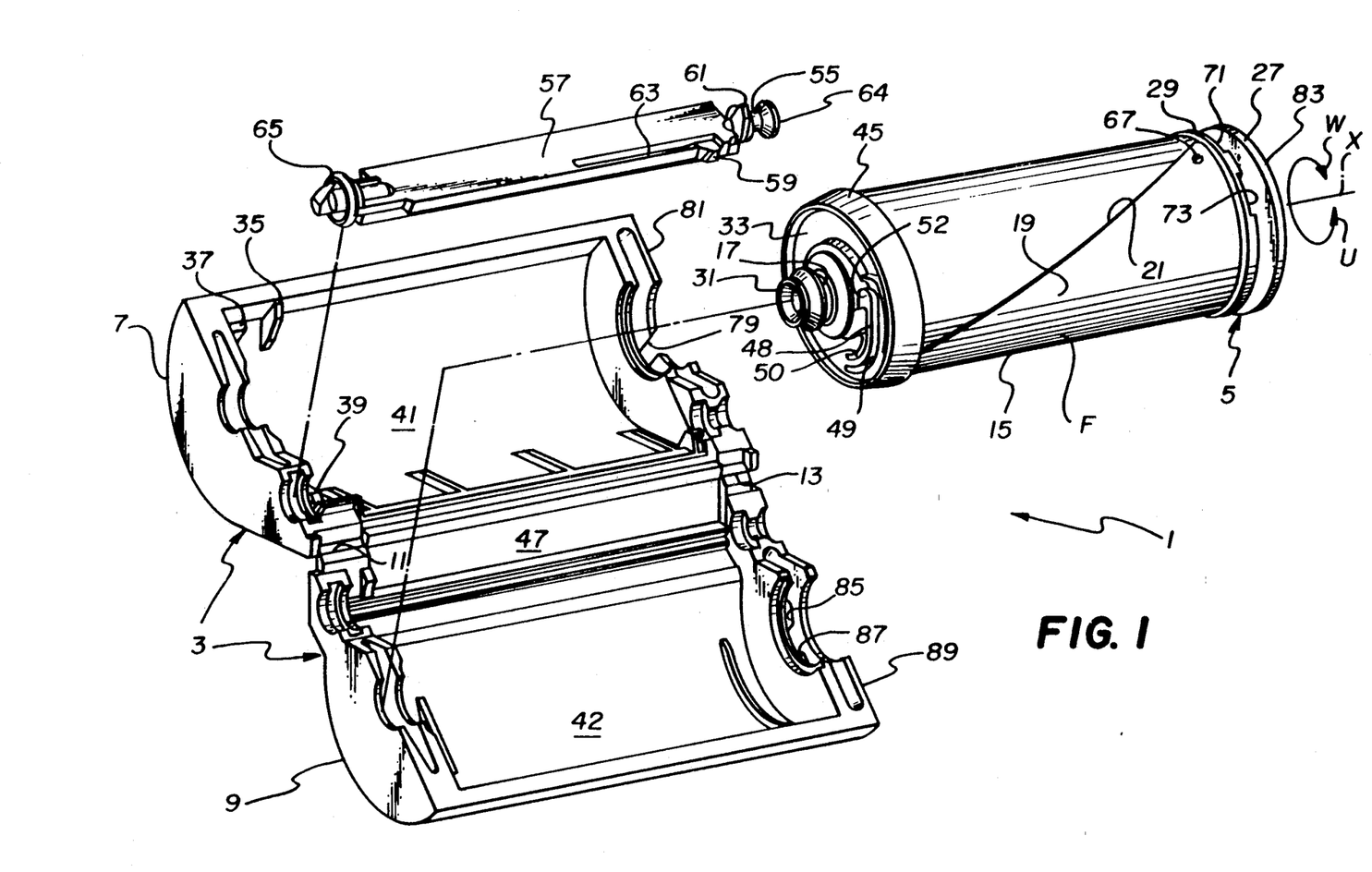
FIG. 1 is an exploded perspective view of a film cassette according to a preferred embodiment of the invention, showing two halves of the cassette shell opened and the various cassette components removed from the shell halves.
Figure 2:
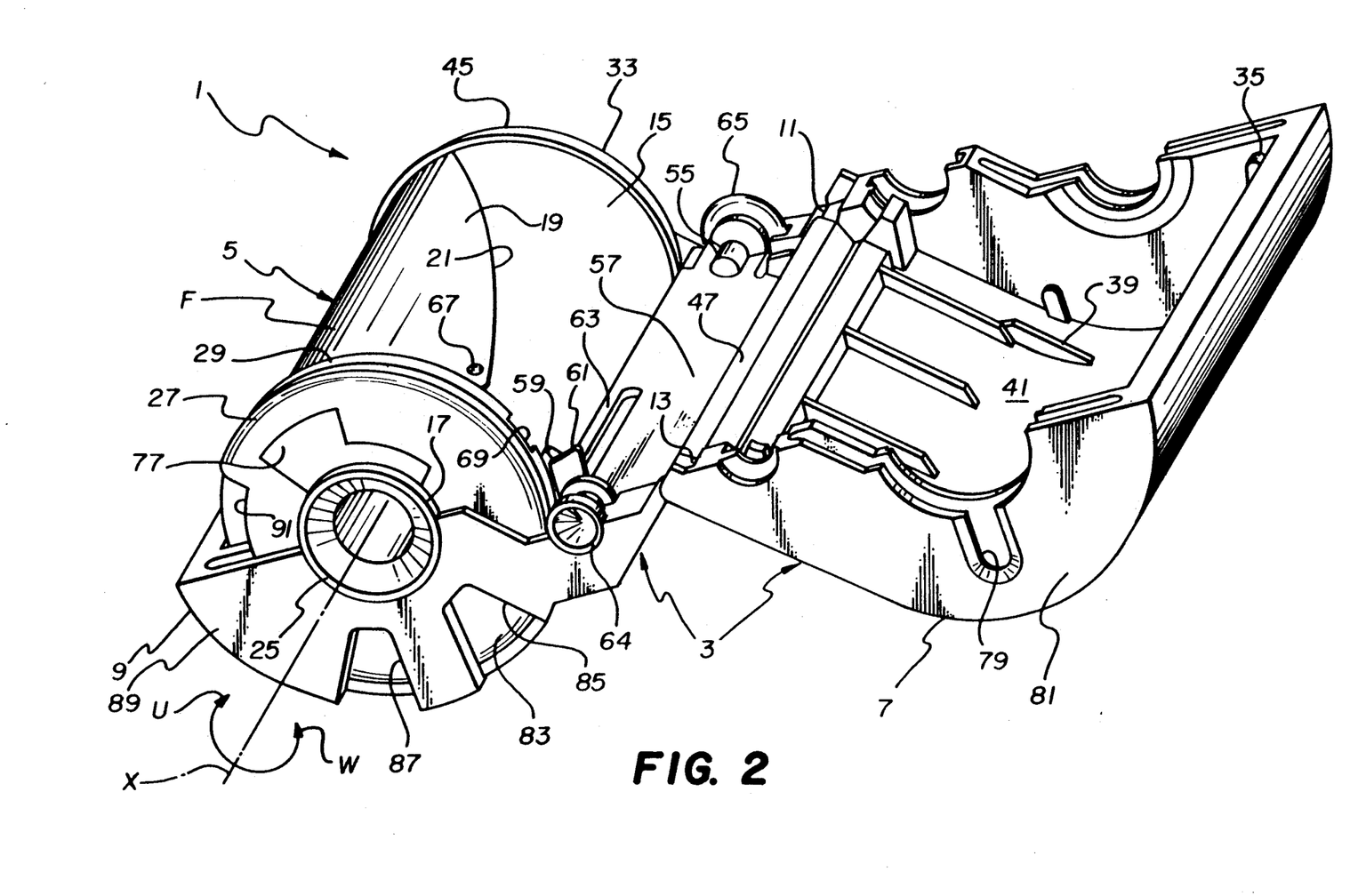
FIG. 2 is a perspective view of the film cassette, showing the two shelf halves opened with the various cassette components in place.

Referring now to the drawings, FIGS. 1 and 2 show a 35 mm film cassette 1 comprising a cassette shell 3 and a film spool 5. The film spool 5 is rotatable about an axis X in film unwinding and film winding directions U and W inside the cassette shell 3. The cassette shell 3 consists of two shell halves 7 and 9 which are connected by a pair of spaced, integrally formed hinges 11 and 13 and otherwise are secured together by known means.

Figure 4:
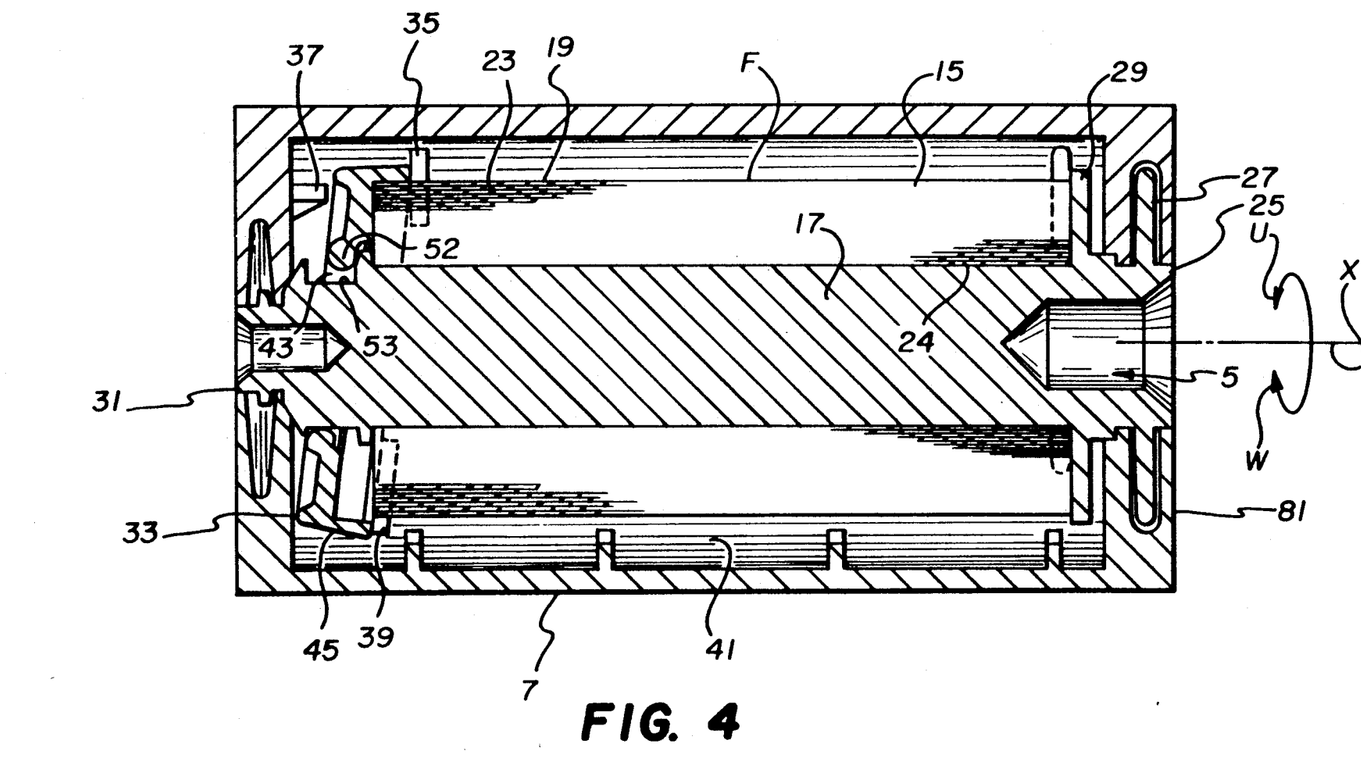
FIG. 4 is an elevation view in cross-section of the film cassette.
Figure 8:
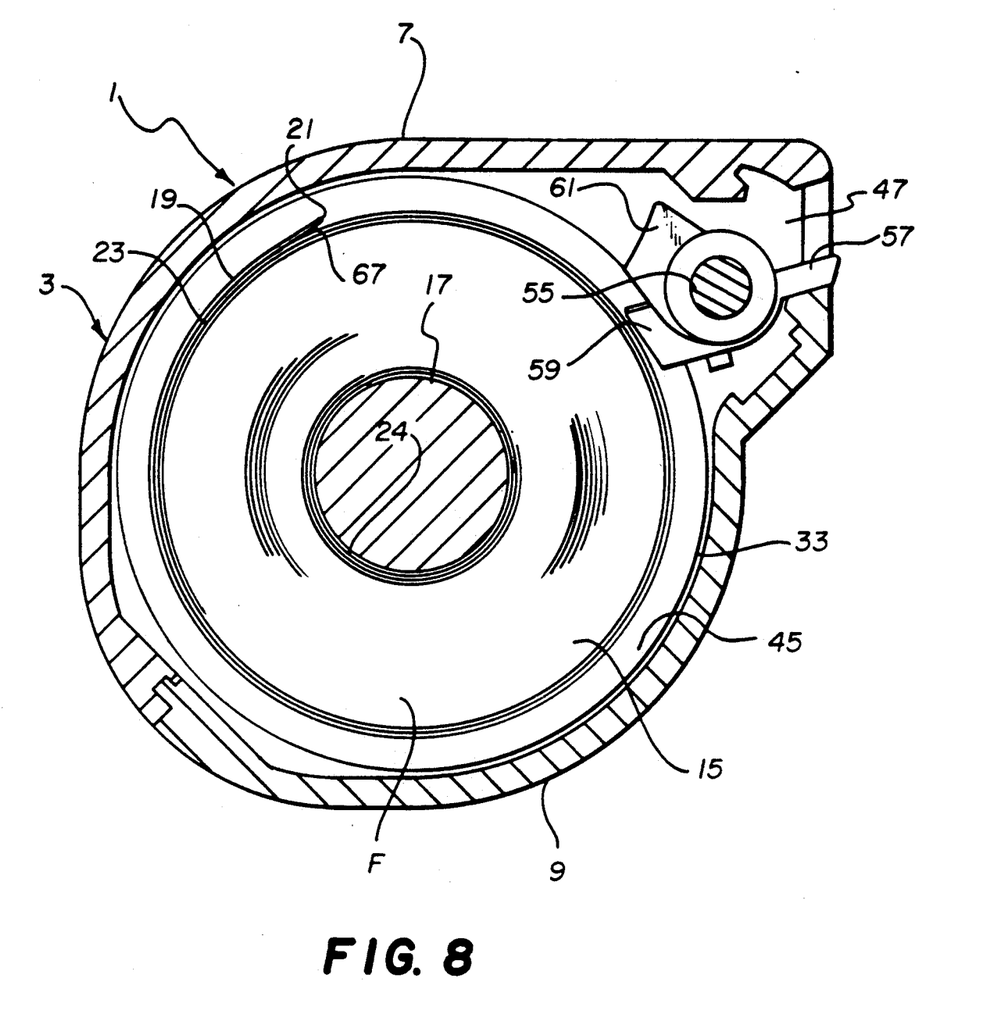

A roll 15 of 35 mm filmstrip F is coiled about a core or hub 17 of the film spool 5 to form successive convolutions of the filmstrip. As shown in FIGS. 4 and 8, the film roll 15 includes an outermost convolution which is a film leader 19 having a leading or forward inclined end 21, and it includes a next inward convolution 23 coiled beneath the outermost convolution. An inner or trailing end of an innermost convolution 24 of the film roll 15 is secured to the spool core 17 by appropriate means such as a hook or tape, not shown.

Adjacent one end 25 of the spool core 17, a pair of parallel inner and outer rigid disks 27 and 29 are integrally formed with the spool core. Both of the disks 27 and 29 are arranged perpendicular to the axis X. See FIGS. 1–4. Adjacent another end 31 of the spool core 17, a rigid flange 33 is supported inclined to the axis X by four disk guides 35, 37 and 39, only three shown, projecting from an inner wall 41 of the shell half 7. Other disk guides, not shown, project from an inner wall 42 of the shell half 9. The flange 33 has a central opening 43 through which the spool core 17 extends to allow rotation of the spool core independently of the flange, and it includes an annular lip or skirt 45 which circumferentially extends from the flange. As shown in FIGS. 1 and 4, the inner disk 29 and the flange's annular lip 45 are spaced from each other a distance that is less than the width W of the filmstrip F for an approximately 270° arc that is remote from a film egress/ingress passageway 47 to outside the cassette shell 3, to radially confine the film leader 19 to the film roll 15 along that arc in order to substantially prevent clock-springing of the film roll against the respective inner walls 41, 42 of the shell halves 7, 9. Conversely, the inner disk 29 and the flange's annular lip 45 are spaced from each other a distance that is greater than the width W of the filmstrip F for an approximately 90° arc that is close to the passageway 47, to allow the film leader 19 beginning with its leading end 21 to escape the radial confinement of the flange's annular lip along that arc in order to enter the passageway. A functionally similar arrangement is disclosed in commonly assigned U.S. Pat. No. 4,832,275, issued May 23, 1989.

Flange To Spool Core Engagement

Figure 5:
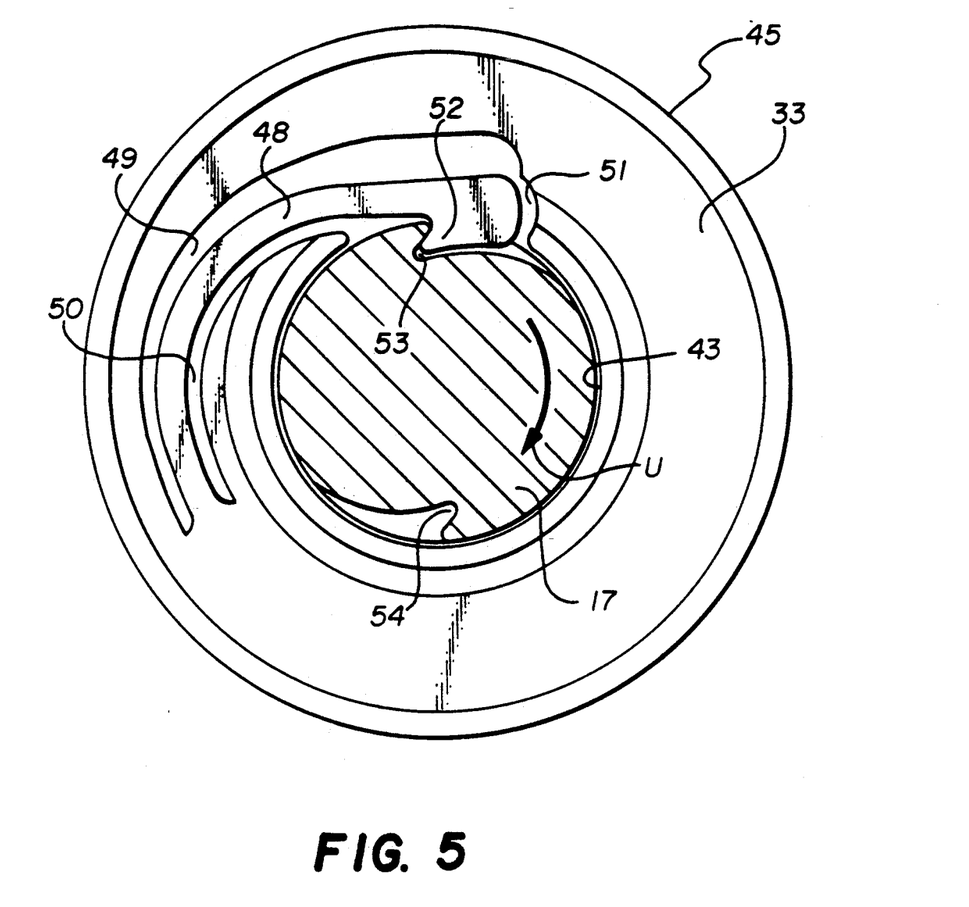
FIG. 5 is a plan view in cross-section of a flange to spool core engagement in the film cassette.

The flange 33 includes an integrally formed resilient cantilever 48 bordered by a pair of longitudinal slits or openings 49 and 50 cut in the flange to interconnect at a common opening 51 to the central opening 43 of the flange. See FIG. 5. The cantilever 48 has a free end portion at the common opening 51 which defines a locking pawl 52 that is inherently biased against the periphery of the spool core 17 at a location within the central opening 43, to drop into either one of two identical notches or detents 53 and 54 cut in the periphery of the spool core. When the locking pawl 52 rests against the periphery of the spool core 17, the cantilever 48 occupies the longitudinal slit 49. When the locking pawl 52 is in one of the detents 53, 54, it is removed from the longitudinal slit 49. The locking pawl 52 and the detents 53, 54 are complementarily shaped to locking engage the pawl and one of the detents when the spool core 17 is rotated relative to the flange 33 in the unwinding direction U. Once the locking pawl 52 and one of the detents 53, 54 are lockingly engaged, the flange 33 must rotate with the spool core 17 in the unwinding direction. Conversely, the locking pawl 52 and the detents 53, 54 are complementarily shaped to disengage the pawl and one of the detents and force the pawl onto the periphery of the spool core 17 when the spool core is rotated relative to the flange 33 in the winding direction W. Other details of the locking pawl 52 and the detents 53, 54 are disclosed in cross-referenced application Ser. No. 07/787,903. Another type of flange to spool core engagement arrangement is disclosed in commonly assigned U.S. Pat. No. 5,031,852, issued Jul. 16, 1991.

Unitary Film Stripper, Spool Lock and Light Valve

A control shaft 55 has an integrally formed light valve 57, film stripper 59 and spool lock 61. See FIGS. 1-4. The stripper 59 comprises the free end of a resilient cantilever 63 extending from the control shaft 55.

Figure 3:
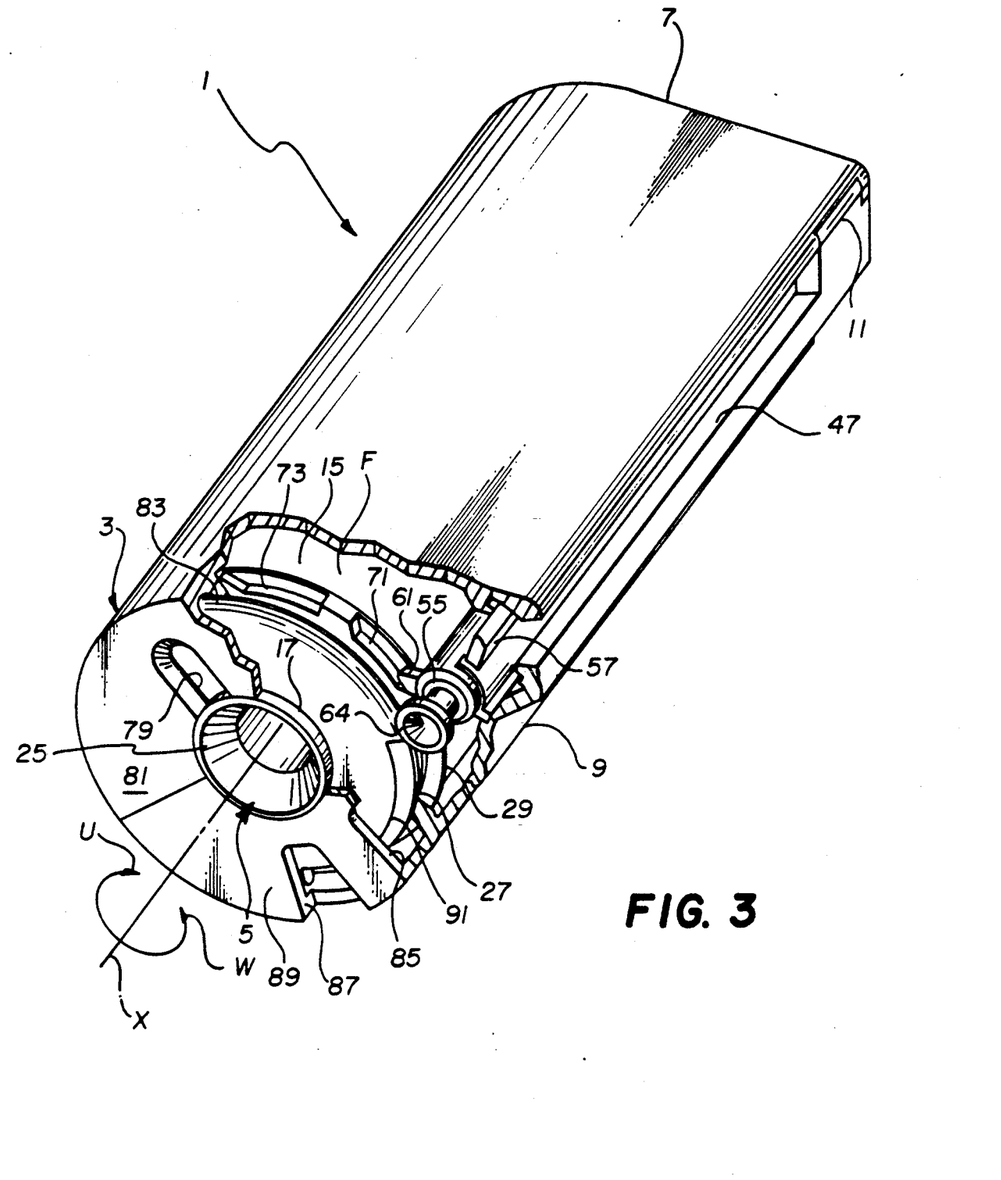
FIG. 3 is a perspective of the film cassette partly cut away.

The control shaft 55 is rotatably supported within the cassette shell 3 by the shell halves 7 and See FIGS. 1-3. Opposite ends 64 and 65 of the control shaft 55 are accessible at the exterior of the cassette shell 3 for engagement to rotate the control shaft.

Figure 6:
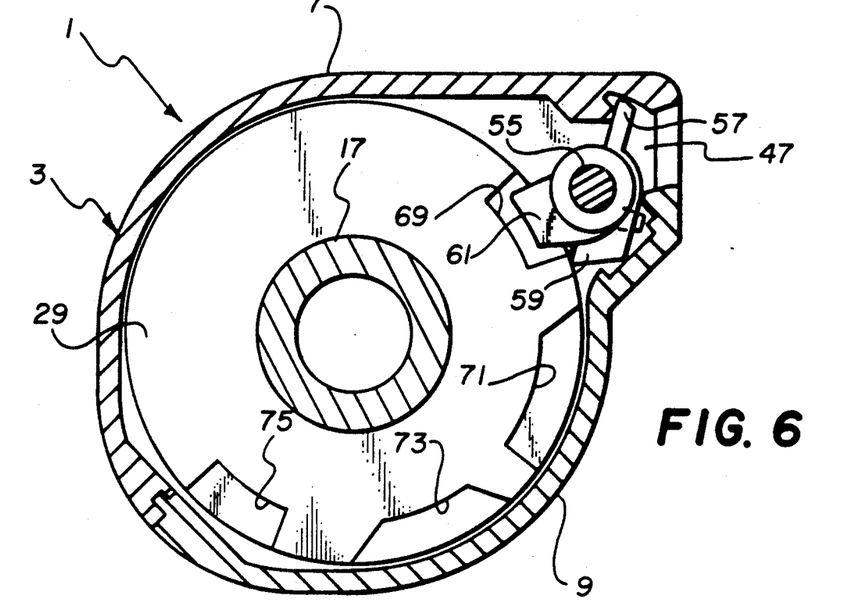
FIGS. 6–14 are either plan views in cross-section or end views of the film cassette, showing operation of a unified light valve, film stripper and spool lock.

As shown in FIG. 6, when the control shaft 55 is rotationally oriented with the light valve 57 in a light blocking or closed position extending across the film egress/ingress passageway 47 to prevent ambient light from entering the cassette shell 3 through the passageway, the film stripper 59 is in a non-stripping position removed from the film roll 15. Conversely, as shown in FIG. 8, when the control shaft 55 is rotationally oriented with the light valve in a non-blocking or opened position to allow movement of the filmstrip F through the passageway 47, the stripper 59 is in a stripping position to be received between the leading end 21 of the film leader 19 and the next-inward convolution 23 of the film roll 15 responsive to rotation of the film spool 5 in the unwinding direction U. If the film spool 5 is rotated in the unwinding direction U with the stripper 59 in its stripping position, the film leader 19 beginning with the leading end 21 will be guided by the stripper from between the flange's annular lip 33 and the inner disk 29 into the passageway 47. A protruberance 67 may be provided on the underside of the film leader 19 at a location proximate the leading film end 21 to normally lie against the outside of the next-inward film convolution 23, to maintain a slight space between the leading film end and the next-inward film convolution for receipt of the stripper 59. See FIG. 8.

Figure 7:
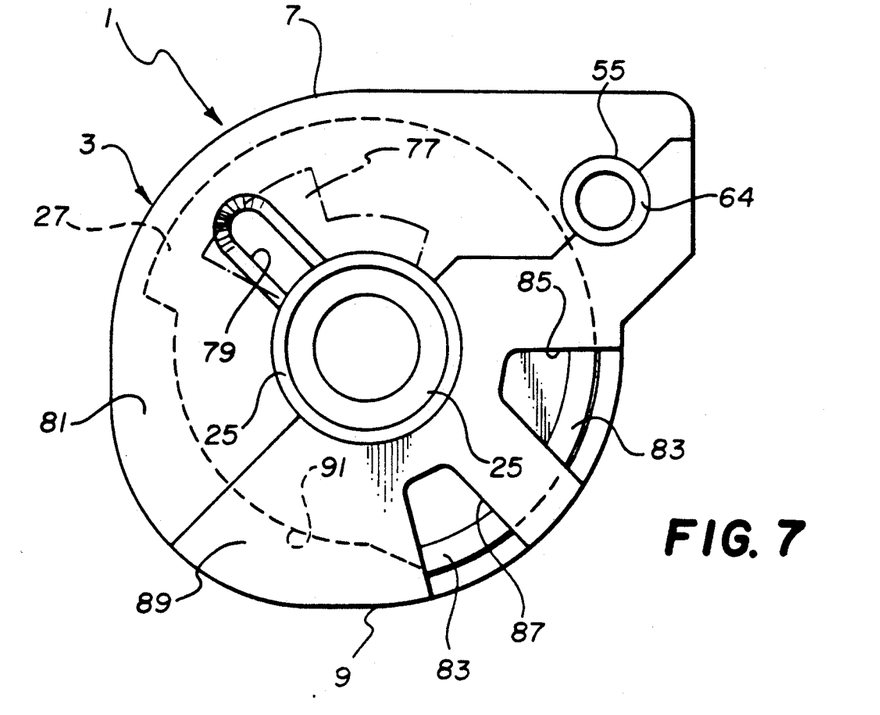
Figure 9:
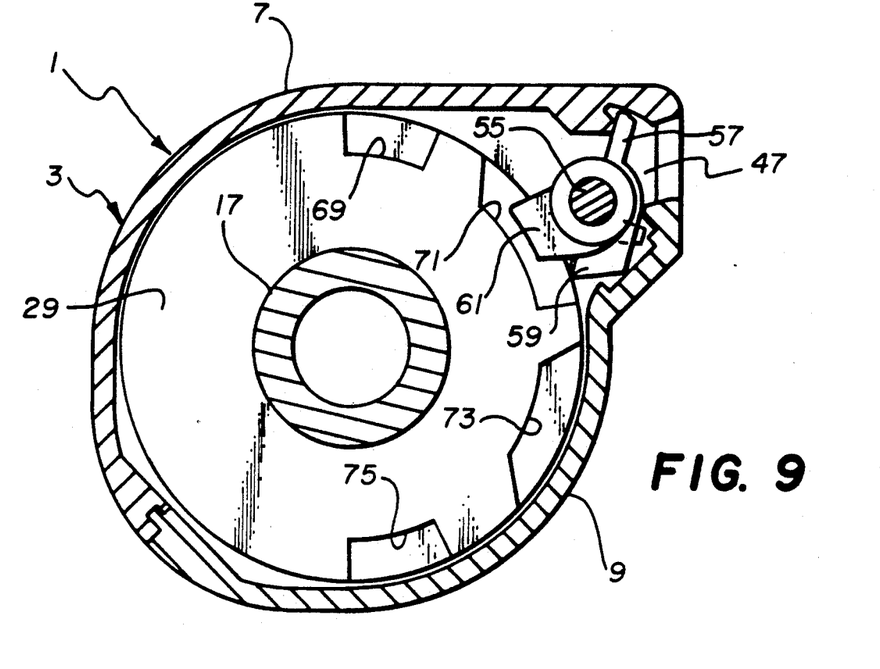
Figure 10:
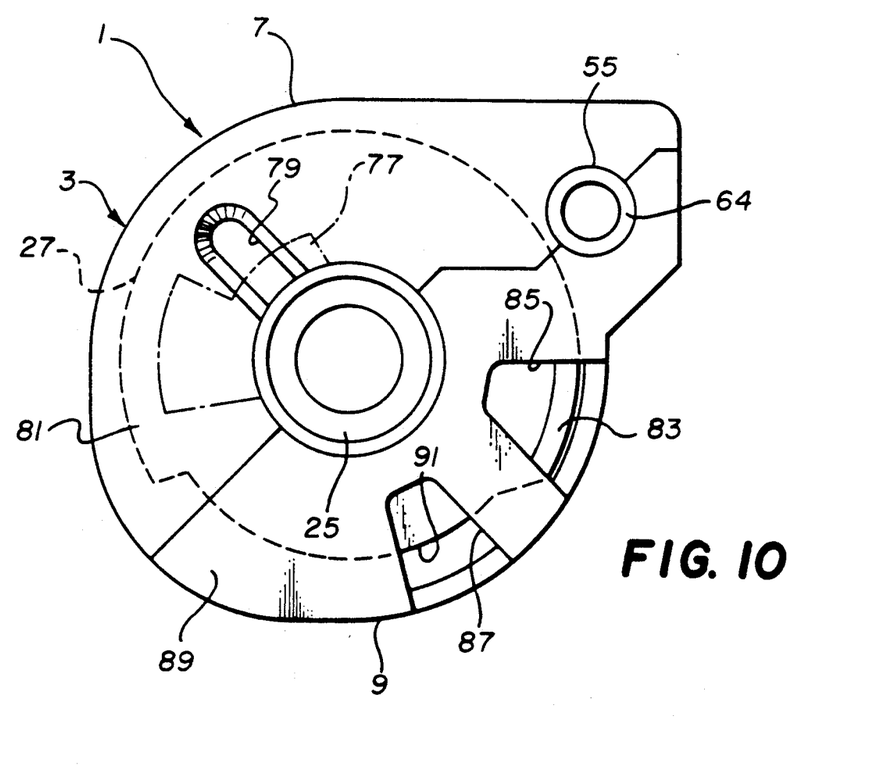
Figure 11:
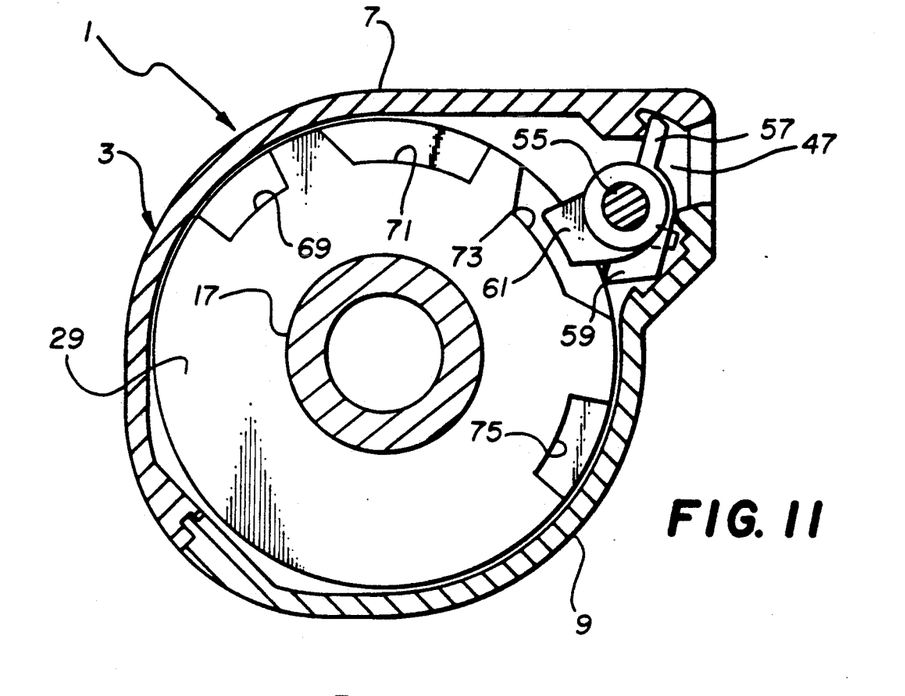
Figure 12:
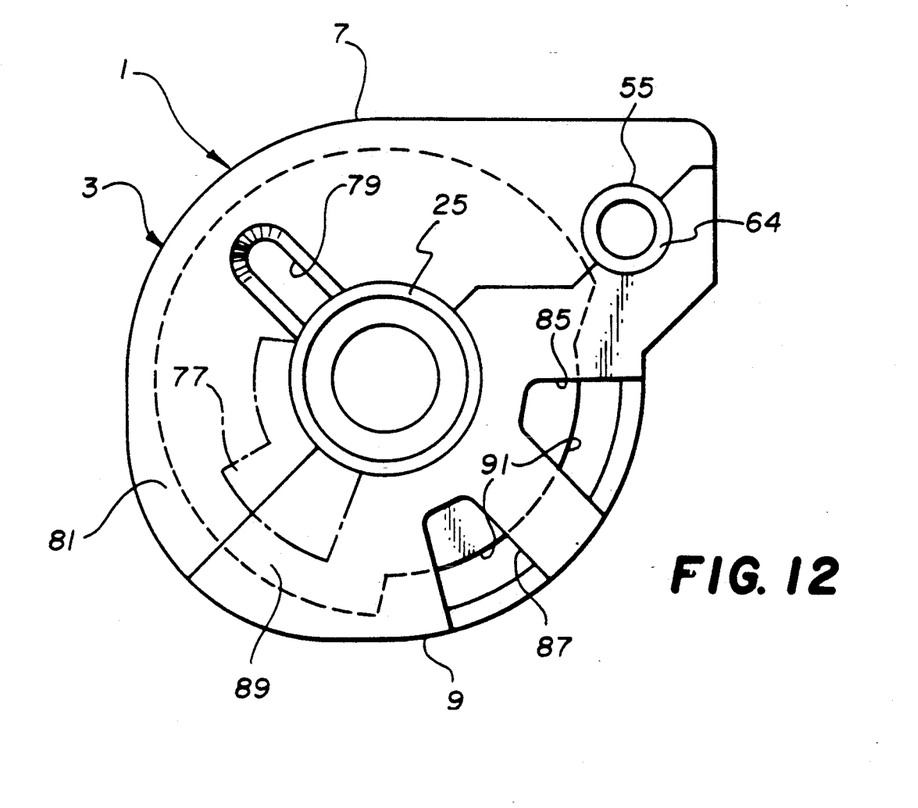
Figure 13:
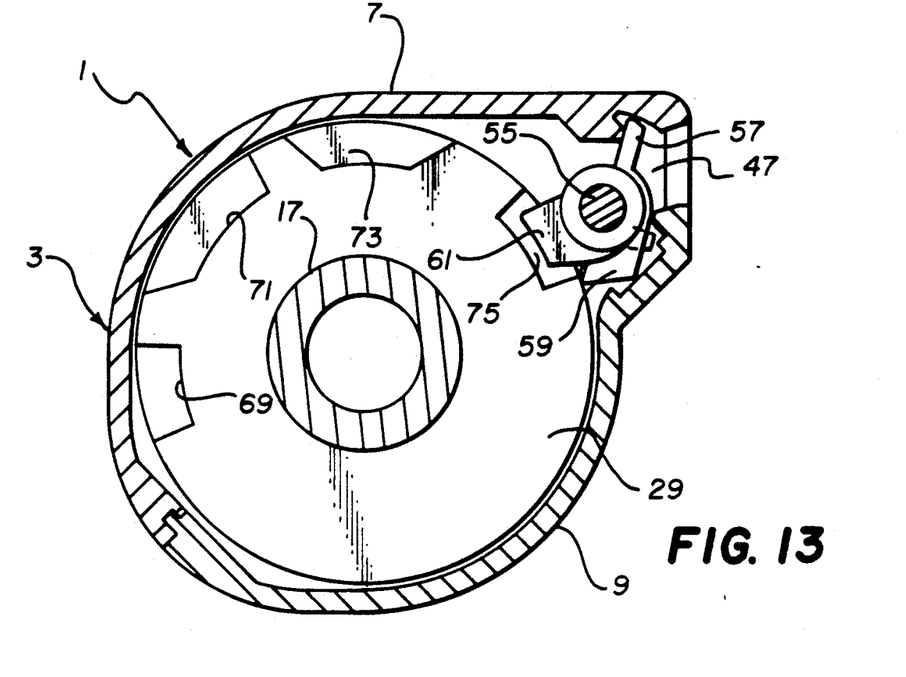
Figure 14:
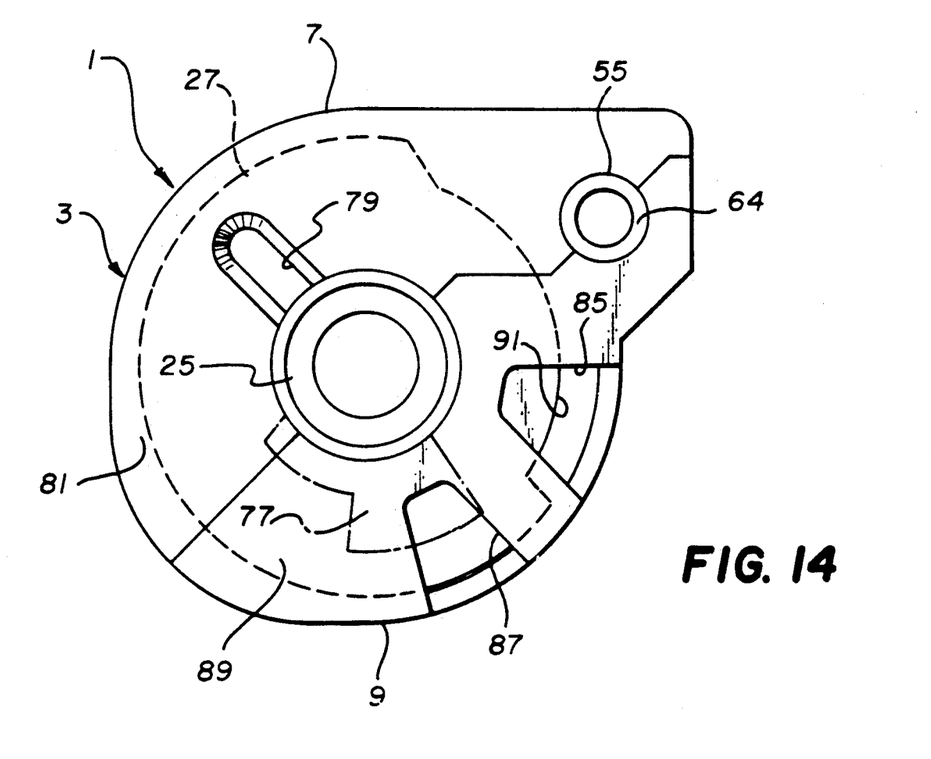

As shown in FIGS. 2 and 8, when the control shaft 55 is rotationally oriented with the light valve 57 in its non-blocking position, the spool lock 61 is in a non-locking position removed from the inner disk 29. Conversely, as shown in FIG. 6, when the control shaft 55 is rotationally oriented with the light valve 57 in its light blocking position, the spool lock 61 is in a locking position protruding into any one of four notches or detents 69, 71, 73 and 75 cut in the periphery of the inner disk 29, to prevent substantial rotation of the film spool 5 in the unwinding and winding directions U and W. Other details of the spool lock 61 are disclosed in cross-referenced application Ser. No. 07/787,356. When the spool lock 1 protrudes into the detent 69, the film spool 5 is rotationally arrested with a film exposure status indicator 77 completely filling a window 79 in one end 81 of the shell half 7, to visibly indicate the filmstrip F is unexposed (fresh). See FIGS. 6 and 7. Moreover, a beveled edge portion 83 of the outer disk 27 is present at two windows 85 and 87 in the end 89 of the shell half 9, to disable a cassette load prevention mechanism in a camera or other apparatus adapted to receive the film cassette 1. See FIG. 7. An example of the cassette load prevention mechanism is disclosed in commonly assigned U.S. Pat. Nos. 5,032,861, issued Jul. 16, 1991, and 5,047,794, issued Sep. 10, 1991. When the spool lock 61 protrudes into the detent 71, the film spool 5 is rotationally arrested with the exposure status indicator 77 only partly filling the window 79 to visibly indicate the filmstrip F is partly exposed. See FIGS. 9 and 10. Moreover, the beveled edge portion 83 is only present at the window 85. A cut-out edge portion 91 of the outer disk 27 is present at the window 87. See FIG. 10. Consequently, the cassette load prevention mechanism would be disabled at the window 87 but not at the window 85. This permits the film cassette 1 to be used with two different types of cameras, one that can receive the film cassette with the filmstrip F either partly exposed or unexposed and the other that can receive the film cassette only with the filmstrip unexposed. When the spool lock 61 protrudes into the detent 73, the film spool 5 is rotationally arrested with the exposure status indicator 77 completely removed from the window 79 to visibly indicate the filmstrip F is fully exposed. See FIGS. 11 and 12. Moreover, the cut-out edge portion 91 is present at the windows 85 and 87. See FIG. 12. Consequently, the cassette load prevention mechanism would be disabled at the windows 85 and 87. This is in order to prevent any type camera from receiving the film cassette 1 with the filmstrip F fully exposed. When the spool lock 61 protrudes into the detent 75, the film spool 5 is rotationally arrested with the exposure status indicator 77 completely removed from the window 79. However, another indicator, not shown, may be provided on the outer disk 27 to be present at the window 79 to visibly indicate the filmstrip F has been processed to develop any latent images. See FIGS. 13 and 14. Moreover, the cut-out edge portion 91 is present at the window 85 and the beveled edge portion 83 is present at the window 87. See FIG. 14. Consequently, the cassette load prevention mechanism would be disabled at the window 85 but not the window 87. This is in order to allow the film cassette 1 only to be received in apparatus other than a camera, such as an image display device, which would make use of the filmstrip F when it is processed.

Operation

Initially, the control shaft 55 must be rotated to move the light valve 57 from its light blocking position to its non-blocking position, to move the spool lock 61 from its locking position to its non-locking position, and to move the film stripper 59 from its non-stripping position to its stripping position. See FIGS. 6 and 7.

Then, the spool core 17 is rotated relative to the flange 33 in the unwinding direction U until the two pieces are lockingly engaged by means of the locking pawl 52 and one of the detents 53, 54. See FIG. 5. Continued rotation of the spool core 17 in the same direction will similarly rotate the flange 33 to allow successive longitudinally sections of the filmstrip F beginning with its leading end 21 to exit from between the flange's annular lip 45 and the inner disc 29 along the 90° arc close to the film egress/ingress passageway 47 where the lip and the disc are spaced from each other a distance that is greater than the width W of the filmstrip F. Simultaneously, the film stripper 59 will direct successive longitudinal sections of the filmstrip F beginning with its leading end 21 into the passageway 47 for advancement outside the cassette shell 3.

The invention has been described with reference to a preferred embodiment. However, it will be appreciated that variations and modifications can be effected within the ordinary skill in the art without departing from the scope of the invention.

I claim:

1. A film cassette wherein a spool is supported for rotation in an unwinding direction inside a cassette shell, a convoluted film roll whose outermost convolution is a film leader is coiled about said spool, a stripper is supported for movement to a stripping position within reach of said film roll for receipt between said film leader and a next inward convolution of the film roll to guide the film leader into a film egress passageway responsive to rotation of said spool in the unwinding direction and to an non-stripping position out of reach of the film roll, and light blocking means is supported for movement to a light blocking position when said stripper is moved to its non-stripping position for preventing ambient light from entering said shell through said passageway and to non-blocking position when the stripper is moved to its stripping position, and wherein the improvement comprises:

said stripper and said light blocking means together are one integral piece.

2. The improvement as recited in claim 1, wherein said shell supports said one piece for rotation of its stripper and its light blocking means about a common axis to their respective positions.

3. The improvement as recited in claim 1, wherein said one piece has a cantilever portion with a free end that defines said stripper.

4. The improvement as recited in claim 1, wherein said light blocking means is both rigid and sized to block said passageway to bar said film leader from being moved into the passageway when the light blocking means is in its light blocking position.

* * * * *